(12) United States Patent
Yeh et al.

(10) Patent No.: US 8,599,344 B2
(45) Date of Patent: Dec. 3, 2013

(54) DISPLAY APPARATUS

(75) Inventors: Chao-Wei Yeh, Taoyuan County (TW); Chien-Huang Liao, Hsinchu (TW); Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 253 days.

(21) Appl. No.: 13/219,705

(22) Filed: Aug. 28, 2011

(65) Prior Publication Data
US 2012/0293750 A1    Nov. 22, 2012

(30) Foreign Application Priority Data
May 19, 2011    (TW) .............................. 100117600 A

(51) Int. Cl.
*G02F 1/1335*    (2006.01)
*G02F 1/1337*    (2006.01)

(52) U.S. Cl.
USPC ............... 349/129; 349/33; 349/96; 349/144

(58) Field of Classification Search
USPC ...................................... 349/33, 96, 129, 144
See application file for complete search history.

(56) References Cited

U.S. PATENT DOCUMENTS

| 7,667,809 B2 | 2/2010 | Kazuyoshi et al. |
| 7,821,608 B2 | 10/2010 | Shinichi et al. |
| 2007/0040975 A1 * | 2/2007 | Momoi .......................... 349/129 |
| 2007/0200989 A1 | 8/2007 | Shinichi et al. |
| 2008/0143930 A1 * | 6/2008 | Jin et al. .......................... 349/96 |

FOREIGN PATENT DOCUMENTS

| CN | 1991469 | 7/2007 |
| CN | 101425274 | 5/2009 |
| JP | 2007-148279 | 6/2007 |
| JP | 2007-178736 | 7/2007 |

OTHER PUBLICATIONS

"First Office Action of China Counterpart Application", issued on Sep. 7, 2012, p. 1-5, in which the listed references (JP2007-148279, JP2007-178736, CN1991469 and CN101425274) were cited.

* cited by examiner

*Primary Examiner* — Michael Caley
(74) *Attorney, Agent, or Firm* — Jianq Chyun IP Office

(57) ABSTRACT

A display apparatus includes a display panel disposed between a first polarizer and a second polarizer and having at least one first area and at least one second area. A first light-transmission axis direction of the first polarizer is substantially perpendicular to a second light-transmission axis direction of the second polarizer. The first light-transmission axis direction intersects a horizontal axis direction by about 45 degrees. When the display panel is in a narrow viewing angle display mode, the first and second areas have different brightness in a side viewing angle direction but have the same brightness in and around a normal viewing angle direction. When the display panel is in a wide viewing angle display mode, the first and second areas have substantially the same brightness in various viewing angle directions.

18 Claims, 10 Drawing Sheets

DISPLAY APPARATUS

CROSS-REFERENCE TO RELATED APPLICATION

This application claims the priority benefit of Taiwan application serial no. 100117600, filed on May 19, 2011. The entirety of the above-mentioned patent application is hereby incorporated by reference herein and made a part of this specification.

BACKGROUND OF THE INVENTION

1. Field of the Invention

The invention generally relates to a display apparatus, and more particularly, to a display apparatus having a privacy protecting function.

2. Description of Related Art

Recently, a display apparatus is required to have the characteristics of wide viewing angles when displaying images, so as to comply with the demand that a plurality of users simultaneously watch the images displayed on the same display apparatus. Nevertheless, on certain conditions, such as writing down business information or inputting personal account number and password into an ATM machine, the characteristics of wide viewing angles of the display apparatus may cause the reveal of users' personal information. Accordingly, the display apparatus is required to have the privacy protecting design, so as to prevent others from spying on the highly confidential data.

At present, a privacy protecting design is proposed and achieved by way of the alignment configuration of a liquid crystal display (LCD) panel. In such privacy protecting technology, the LCD panel in the display apparatus serves to perform the display function. Generally, the LCD panel is disposed between two polarizers, while the light-transmission axis directions of the two polarizers are respectively parallel to the column direction and the row direction of the pixel array in the LCD panel. Namely, the light-transmission axis directions of the two polarizers are generally restricted to be at a 0-degree azimuth angle (row direction) and a 90-degree azimuth angle (column direction), respectively, and an included angle between the light-transmission axis directions of the two polarizers is substantially 90 degrees. Meanwhile, the LCD panel is divided into two areas, such as the first area and the second area.

The distribution of the display brightness provided by the first area and the second area of the LCD panel tends to be different at different polar viewing angles and different azimuth viewing angles. Here, the polar viewing angle refers to the included angle between the observation direction of the user and the baseline when the nomal viewing angle direction (defining the 0-degree polar viewing angle) serves as the baseline (i.e., the normal line of the LCD panel), and the azimuth viewing angle refers to the included angle on the horizontal surface between the observation direction of the user and a horizontal axis direction. By applying said design, the LCD panel can perform the privacy protecting function. The brightness distribution in the known LCD panel at different polar viewing angles is described below.

FIG. 1 shows the relationship between the display brightness of a conventional LCD panel in the privacy protecting mode and the corresponding polar viewing angles when images displayed on the LCD panel are observed at various polar viewing angles along the horizontal axis direction (i.e., at the 0-degree azimuth viewing angle or the 180-degree azimuth viewing angle). With reference to FIG. 1, the curve 110 shows the relationship between the display brightness provided by the first area of the display panel and the polar viewing angles when images displayed on the display panel in the privacy protecting mode are observed at various polar viewing angles along the horizontal axis direction, for instance, and the curve 120 shows the relationship between the display brightness provided by the second area of the display panel and the polar viewing angles when the images displayed on the display panel in the privacy protecting mode are observed at various polar viewing angles along the horizontal axis direction. Here, the polar viewing angle in the normal viewing angle direction (i.e., the normal viewing angle) is defined as 0 degree, for instance, and the normal viewing angle represents that the observation direction of the user is perpendicular to the outer surface of the substrate of the display panel. At this time, the normal viewing angle is defined as the 0-degree polar viewing angle, and the outer surface of the substrate of the LCD panel is at the 90-degree polar viewing angle.

As shown by the curve 110 and the curve 120, the brightness of the first area is identical to the brightness of the second area when the observation direction is at the normal viewing angle (i.e., the 0-degree polar viewing angle). Accordingly, the user can observe the clear display images if both eyes of the user receive the display images at the normal viewing angle. By contrast, at the polar viewing angle V1, the display brightness of the first area is relatively low, while the display brightness of the second area is relatively high. Therefore, the user who watches the display image at the polar viewing angle V1 can merely observe the unclear images, and thereby the privacy protecting effects can be achieved. In other words, the image data obtained by both eyes of the user at the polar viewing angle V1 are less sufficient than the image data obtained by both eyes of the user at the normal viewing angle. The user needs to watch the images in the normal viewing angle direction to obtain the complete and clear image data, and others who watch the images in the side viewing angle direction can only obtain the unclear images or the incomplete image data. Therefore, the aforesaid privacy protecting mode can be referred to as a narrow viewing angle display mode.

It should be mentioned that the first area and the second area have the same display brightness when the polar viewing angle is 0 degree, as shown by the curve 110 and the curve 120. Due to the fact that both eyes of the user are separated from each other by a distance, the viewing angle at which the user observes the display images on the display panel in the normal viewing angle direction may actually range from an angle V2 to an angle V3, e.g., within the range of the 0-degree normal viewing angle ±5 degrees. That is to say, the user located in the normal viewing angle direction observes the display images on the LCD panel at the angles around the normal viewing angle rather than right at the normal viewing angle. At this time, the brightness of the first area differs from the brightness of the second area, and thereby the user who watches images at the normal viewing angle may feel dizzy. In summary, although the privacy protecting mode, i.e., the narrow viewing angle display mode, can preclude the reveal of personal information, the privacy protecting mode discomforts the user located in the normal viewing angle direction.

SUMMARY OF THE INVENTION

The invention is directed to a display apparatus that can perform a privacy protecting function when the display apparatus is in a narrow viewing angle display mode. Specifically, when the display apparatus is in the narrow viewing angle display mode, a user who watches an image in a normal viewing angle direction does not feel dizzy.

The invention is further directed to a display apparatus in which some sub-pixel areas are selectively enabled by means of the layout of alignment areas when the display apparatus is in a narrow viewing angle display mode, so as to achieve privacy protecting effects. In addition, when the display apparatus is in the narrow viewing angle display mode, a user located in a normal viewing angle direction can observe a display image with favorable quality.

In an embodiment of the invention, a display apparatus that includes a display panel is provided. The display panel is disposed between a first polarizer and a second polarizer. A first light-transmission axis direction of the first polarizer is substantially perpendicular to a second light-transmission axis direction of the second polarizer. The first light-transmission axis direction intersects a horizontal axis direction by about 45 degrees. Besides, the display panel has at least one first area and at least one second area. The first area and the second area respectively have a plurality of pixel units arranged in arrays. A row direction of the pixel units is substantially parallel to the horizontal axis direction. Each of the pixel units has a first sub-pixel area and a second sub-pixel area. The first sub-pixel area includes a first alignment area, a second alignment area, and a third alignment area. A first alignment direction of the first alignment area is substantially perpendicular to the horizontal axis direction. The second sub-pixel area is a fourth alignment area. A fourth alignment direction of the fourth alignment area is opposite to the first alignment direction. When the display panel is in a narrow viewing angle display mode, a driving voltage at the first sub-pixel areas in the first area is substantially lower than a driving voltage at the second sub-pixel areas in the first area and a driving voltage at the first sub-pixel areas in the second area, and the driving voltage at the second sub-pixel areas in the first area is substantially higher than the driving voltage at the first sub-pixel areas in the second area and a driving voltage at the second sub-pixel areas in the second area.

In an embodiment of the invention, another display apparatus that includes a display panel is provided. The display panel is disposed between a first polarizer and a second polarizer. A first light-transmission axis direction of the first polarizer is substantially perpendicular to a second light-transmission axis direction of the second polarizer. The first light-transmission axis direction intersects a horizontal axis direction by about 45 degrees. The display panel has at least one first area and at least one second area. The first area and the second area respectively have a plurality of pixel units arranged in arrays, and a row direction of the pixel units is parallel to the horizontal axis direction. Each of the pixel units has a first sub-pixel area and a second sub-pixel area. The first sub-pixel area includes a first alignment area and a second alignment area. A first alignment direction of the first alignment area is substantially perpendicular to the horizontal axis direction. A second alignment direction of the second alignment area intersects the first light-transmission axis direction by about 0 degree to about 45 degrees, and the second alignment direction is not perpendicular to the horizontal axis direction. The second sub-pixel area includes a third alignment area and a fourth alignment area. A third alignment direction of the third alignment area is substantially perpendicular to the horizontal axis direction, and the third alignment direction is opposite to the first alignment direction. A fourth alignment direction of the fourth alignment area intersects the second light-transmission axis direction by about 0 degree to about 45 degrees, and the fourth alignment direction is not perpendicular to the horizontal axis direction. When the display panel is in a narrow viewing angle display mode, a driving voltage at the second sub-pixel areas in the first area is substantially higher than a driving voltage at the first sub-pixel areas in the first area, and a driving voltage at the first sub-pixel areas in the second area is substantially higher than a driving voltage at the second sub-pixel areas in the second area.

Based on the above, the pixel units of the display panel have certain alignment configurations, such that different areas can have different brightness distribution when the display panel is in the narrow viewing angle display mode. As such, the display apparatus in the narrow viewing angle display mode can achieve the privacy protecting effects. Moreover, in the display panel described in the embodiments of the invention, different areas around the normal viewing angle (e.g., within the range of the 0-degree normal viewing angle ±5 degrees) have substantially the same brightness. Therefore, the display apparatus not only can perform the privacy protecting function but also can display images with favorable quality around the normal viewing angle directions, so as to effectively prevent the user from feeling dizzy.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
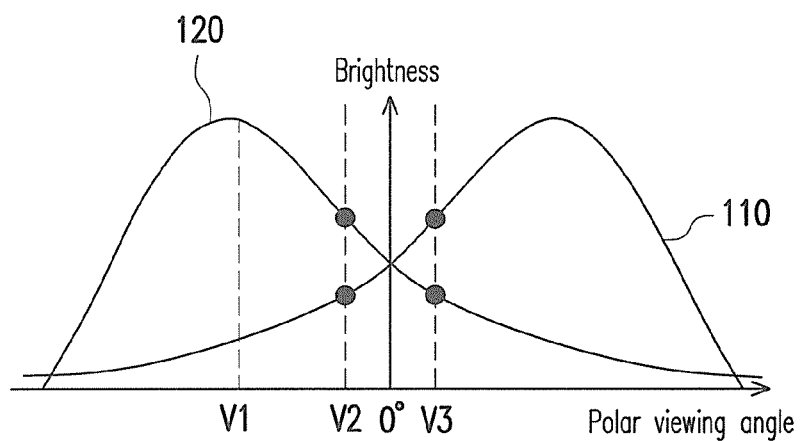
FIG. 1 shows the relationship between the display brightness of a conventional LCD panel in the privacy protecting mode and the corresponding polar viewing angles when images displayed on the LCD panel are observed along the horizontal axis direction (i.e., at the 0-degree azimuth viewing angle or the 180-degree azimuth viewing angle).
Figure 2:
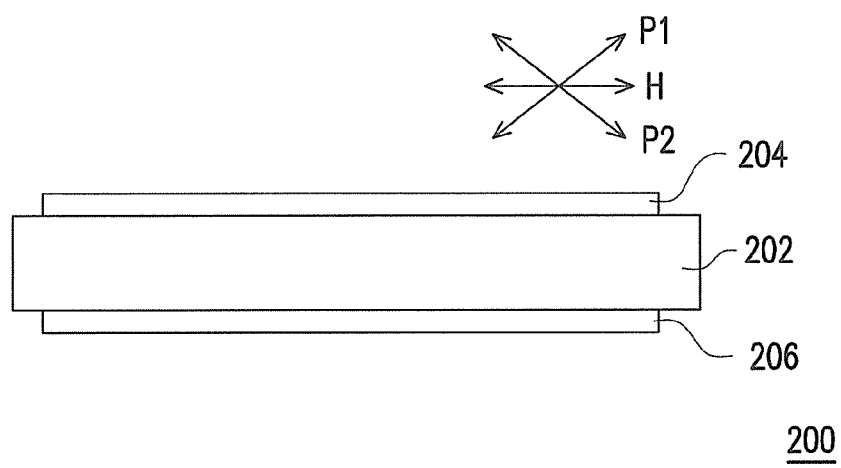
FIG. 2 is a schematic view illustrating a display apparatus according to an embodiment of the invention.

FIG. 2 is a schematic view illustrating a display apparatus according to an embodiment of the invention. With reference to FIG. 2, the display apparatus 200 includes a display panel 202 that is disposed between a first polarizer 204 and a second polarizer 206. For example, the display panel 202 includes a pair of substrates and a display media layer is disposed between the pair of the substrates. In this embodiment, a first light-transmission axis direction P1 of the first polarizer 204 is substantially perpendicular to a second light-transmission axis direction P2 of the second polarizer 206. The first light-transmission axis direction P1 intersects a horizontal axis direction H by about 45 degrees. That is to say, when the horizontal axis direction H serves as a baseline (i.e., approximately at 0 degree), the first light-transmission axis direction P1 is approximately at the 45-degree or 225-degree location, and the second light-transmission axis direction P2 is approximately at the 135-degree or the 315-degree location.

Figure 3:
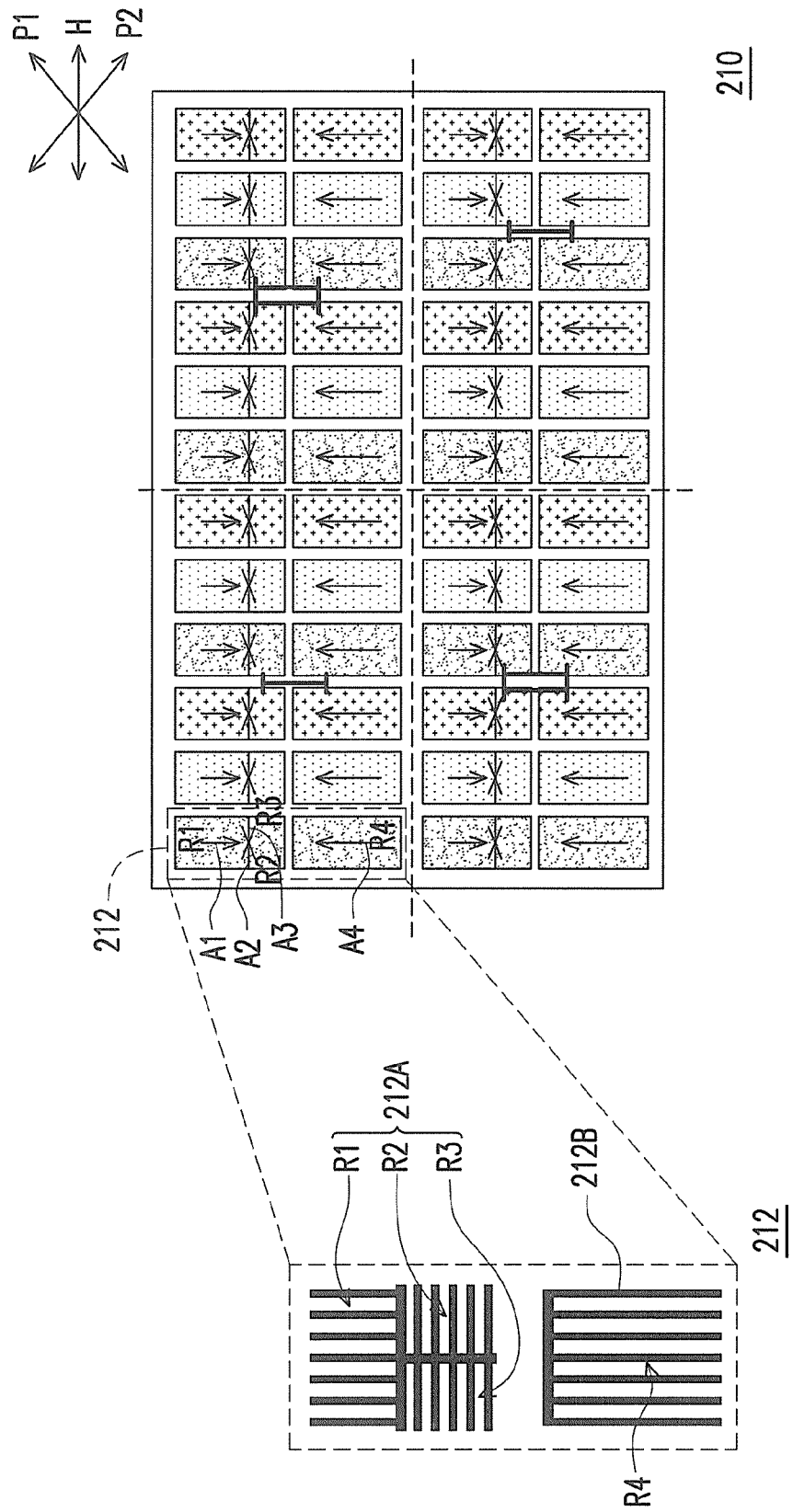
FIG. 3 is a schematic top view illustrating a display panel according to an embodiment of the invention.

FIG. 3 is a schematic top view illustrating a display panel according to an embodiment of the invention. With reference to FIG. 2 and FIG. 3, the display panel 210 shown in FIG. 3 is an alternative example of the display panel 202. The display panel 210 has at least one first area I and at least one second area II. The first area I and the second area II respectively have a plurality of pixel units 212 arranged in arrays. A row direction of the pixel units 212 is substantially parallel to the horizontal axis direction H, for instance. That is to say, the first light-transmission axis direction P1 and the second light-transmission axis direction P2 in the display apparatus 200 respectively intersect the row direction of the pixel units 212 by about 45 degrees. Each of the pixel units 212 has a first sub-pixel area 212A and a second sub-pixel area 212B.

The first sub-pixel area 212A includes a first alignment area R1, a second alignment area R2, and a third alignment area R3. A first alignment direction A1 of the first alignment area R1 is substantially perpendicular to the horizontal axis direction H. A second alignment direction A2 of the second alignment area R2 is opposite to a third alignment direction A3 of the third alignment area R3. Preferably, the second alignment direction A2 and the third alignment direction A3 are substantially parallel to the horizontal axis direction H. In this embodiment, preferably, the second alignment area R2 substantially occupies an area equal to an area of the third alignment area R3. The second sub-pixel area 212B serves as a fourth alignment area R4. A fourth alignment direction A4 of the fourth alignment area R4 is opposite to the first alignment direction A1. In this embodiment, preferably, the fourth alignment direction A4 is substantially perpendicular to the horizontal axis direction H as well.

It should be mentioned that the layout of the alignment areas R1~R4 can be achieved by the pattern design of the pixel electrodes in this embodiment. That is to say, the pixel electrodes applied in the display panel 210 can have the pattern design shown in the left side of FIG. 3. However, the invention is not limited thereto. According to other embodiments of the invention, the layout of the alignment areas R1~R4 can also be achieved by alignment protrusions or in another way.

The first sub-pixel areas 212A and the second sub-pixel areas 212B of this embodiment can display the same image data. For instance, one of the red, blue, and green image data can be simultaneously displayed by the first sub-pixel area 212A and the second sub-pixel area 212B in the same pixel unit 212. Other display colors are applicable in other embodiments, for instance, white, yellow, orange, purple, or other colors on the chromaticity diagram. Besides, the first sub-pixel area 212A and the second sub-pixel area 212B together define four alignment areas R1~R4, so as to provide four different alignment directions A1~A4. Therefore, when all of the alignment areas R1~R4 are enabled, the display panel 210 can achieve the wide viewing angle display effect. Namely, the user is able to observe the display images with the substantially equivalent quality at different viewing angles, or the user is able to observe the complete display image (data) at different viewing angles.

However, the first sub-pixel areas 212A and the second sub-pixel areas 212B of this embodiment lead to different alignment effects. When one of the first sub-pixel areas 212A and the second sub-pixel areas 212B is disabled, or when the first and second sub-pixel areas 212A and 212B are enabled and one of the first and second sub-pixel areas 212A and 212B is driven by a relatively lower driving voltage, the display brightness of the pixel units 212 at a viewing angle other than the normal viewing angle can be significantly reduced. Hence, the display panel 210 of this embodiment is divided into the first area I and the second area II, and the display characteristics of each pixel unit 212 in the first and second areas I and II are controlled for privacy protection.

In order to protect privacy by means of the display panel 210 of this embodiment, whether the alignment areas R1~R4 in the first and second areas I and II are enabled is controlled, so as to correspondingly adjust the brightness distribution in the first and second areas I and II at different polar viewing angles and in different viewing angle directions. The display brightness of the first and second areas I and II around the normal viewing angle is substantially the same herein. However, in the side viewing angle direction (i.e., the observation direction of the user intersects the normal viewing angle direction by 5 degrees or more, or the observation direction of the user intersects the horizontal axis direction H by an azimuth angle), the display brightness of the first and second areas I and II is different. Hence, the user needs to watch the image at the normal viewing angle to obtain the complete image data, and others who watch the image in the side viewing angle direction can only obtain the incomplete image data containing bright and dark areas, so as to achieve the privacy protecting effects.

For instance, in order to protect privacy, a driving voltage at the first sub-pixel areas 212A in the first area I is substantially lower than a driving voltage at the second sub-pixel areas 212B in the first area I and a driving voltage at the first sub-pixel areas 212A in the second area II, and the driving voltage at the second sub-pixel areas 212B in the first area I is substantially higher than the driving voltage at the first sub-pixel areas 212A in the second area II and a driving voltage at the second sub-pixel areas 212B in the second area II. Accordingly, when the image displayed on the display panel 210 is watched at a large viewing angle, the brightness distribution in at least one of the first and second areas I and II is different from the predetermined brightness distribution, and thereby others at the large viewing angle can merely observe the unclear image and cannot invade the user's privacy.

As a whole, the display panel 210 is in a narrow viewing angle display mode when performing the privacy protecting function, and the display panel 210 under normal operation is in a wide viewing angle display mode. Note that others are still able to observe the display image in a large azimuth viewing angle direction or a large polar viewing angle direction when the display panel 210 is in the narrow viewing angle display mode in this embodiment, while the image data obtained by others are not complete.

In particular, when the display panel 210 is in the wide viewing angle display mode, the first and second sub-pixel areas 212A and 212B are enabled. At this time, all of the alignment areas R1~R4 can display images. In other words, the complete image data can be obtained by the user at any viewing angle when the display panel is in the wide viewing angle display mode.

According to this embodiment, the privacy protecting effects can be accomplished by using the display panel having several narrow viewing angle display modes. In the first narrow viewing angle display mode, the first and second sub-pixel areas 212A and 212B in the first area I can be enabled, and the first sub-pixel areas 212A in the second area II are enabled as well. The second sub-pixel areas 212B in the second area II can be selectively disabled or enabled. The driving voltage at the first sub-pixel areas 212A in the first area I can be lower than the driving voltage at the second sub-pixel areas 212B in the first area I. Thereby, in the first area I, the image displayed on the second sub-pixel areas 212B has the relatively high brightness, while the image displayed on the first sub-pixel areas 212A has the relatively low brightness. Namely, in the first area I, only the display brightness of the fourth alignment area R4 is relatively high.

In the second narrow viewing angle display mode, the first sub-pixel areas 212A in the first area I can be selectively disabled, while the second sub-pixel areas 212B in the first area I are enabled. Meanwhile, the first sub-pixel areas 212A of the pixel units 212 in the second area II are enabled. The second sub-pixel areas 212B in the second area II can be selectively disabled or enabled. At this time, in the first area I, the image can only be displayed on the second sub-pixel areas 212B. Namely, in the first area I, the image can only be displayed on the fourth alignment area R4.

In said two narrow viewing angle display modes, the brightness of the image displayed on the first area I is mainly provided by the fourth alignment area R4. Hence, the image with appropriate display brightness can be observed by the user at certain viewing angles. As such, when the display panel 210 is in the narrow viewing angle display mode, the display panel 210 can perform the privacy protecting function.

When the display panel 210 is in the narrow viewing angle display mode, the first and second sub-pixel areas 212A and 212B in the second area II can be selectively enabled, or only the first sub-pixel areas 212A are enabled. In case that the first and second sub-pixel areas 212A and 212B in the second area II are enabled, the first sub-pixel areas 212A and the second sub-pixel areas 212B which are located in the second area II and display the normal viewing brightness can have the driving voltages lower than the driving voltage at the second sub-pixel areas 212B which are located in the first area I and display the normal viewing brightness. Thus, the display brightness of the first and second areas I and II around the normal viewing angle can be substantially the same. Namely, the privacy protecting effects can be achieved not only by modulating the driving voltages but also by adjusting the driving voltages at the sub-pixel areas 212A and 212B which display the normal viewing brightness in this embodiment, so as to accomplish favorable display effects around the normal viewing angle.

Figure 4:
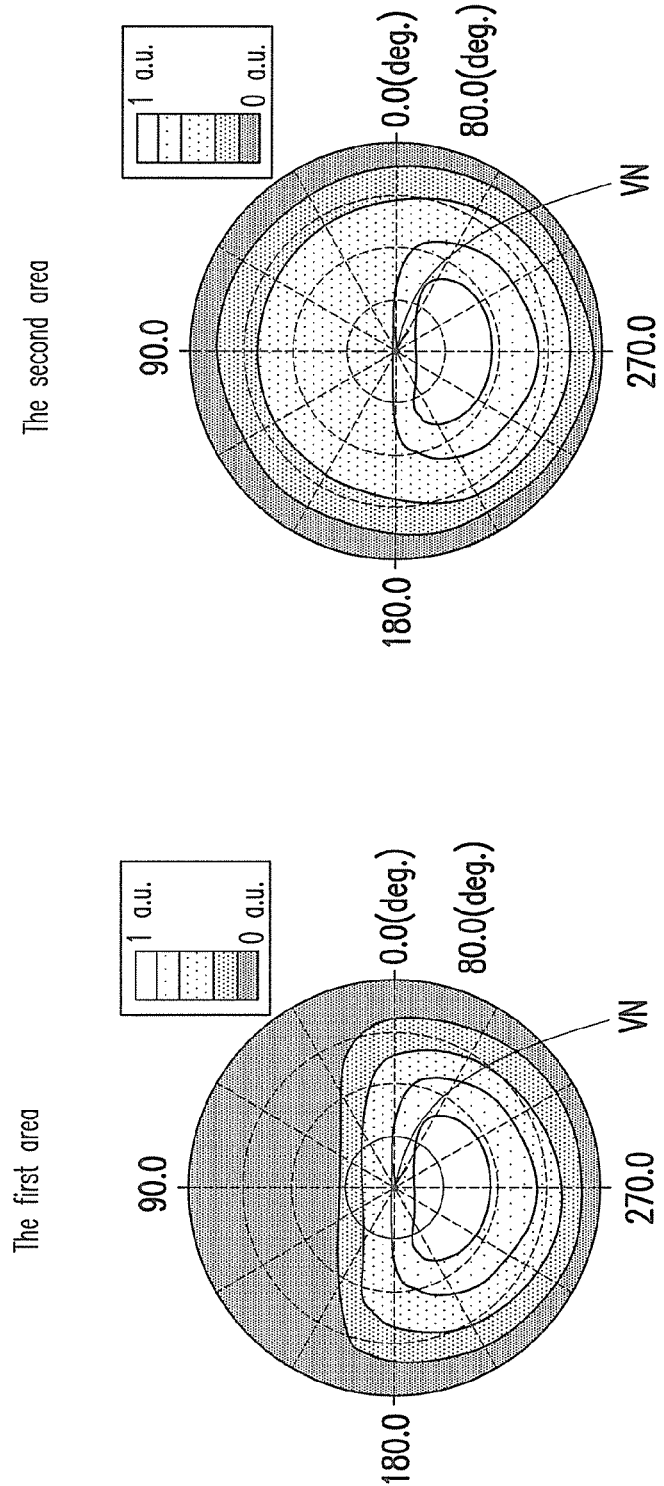
FIG. 4 illustrates the display brightness distribution in a first area and a second area of a display panel in a narrow viewing angle display mode according to the embodiment of the invention.

FIG. 4 illustrates the display brightness distribution in the first area and the second area of the display panel in a narrow viewing angle display mode according to the embodiment of the invention. With reference to FIG. 3 and FIG. 4, in an embodiment of the invention, when the display panel 210 is in the narrow viewing angle display mode, the driving voltage at the second sub-pixel areas 212B that are located in the first area I and display certain normal viewing brightness is approximately 3.1 volts, for instance, and the driving voltages at the first and second sub-pixel areas 212A and 212B which are located in the second area II and display the certain normal viewing brightness are approximately 2.7 volts, for instance. At this time, the brightness distribution in the first area I and the brightness distribution in the second area II are shown in FIG. 4.

It can be learned from FIG. 4 that the display brightness of the first area I and the second area II around the normal viewing angle direction VN is substantially the same. Even though the user observes the image displayed on the display panel at an angle slightly away from the normal viewing angle direction VN (e.g., at the polar viewing angle ±5 degrees), the display brightness of the first area I and the second area II is substantially the same. Therefore, when the privacy protecting effects are achieved by adjusting the display brightness of the alignment areas R1~R4 in this embodiment, the user who observes the complete display image (i.e., the user who is at the normal viewing angle) does not feel dizzy. In the meantime, others in the side viewing angle direction are not able to obtain the complete image data Specifically, as indicated in FIG. 3, the second alignment direction A2 and the third alignment direction A3 of this embodiment are substantially parallel to the horizontal axis direction H, and the fourth alignment direction A4 and the first alignment direction A1 are substantially perpendicular to the horizontal axis direction H. Therefore, the second sub-pixel areas 212B do not provide the display brightness in the side viewing angle direction along the horizontal axis direction H, and the display brightness of the first and second areas I and II at different viewing angles has significantly different variation tendency when the display panel is in the narrow viewing angle display mode.

Figure 5:
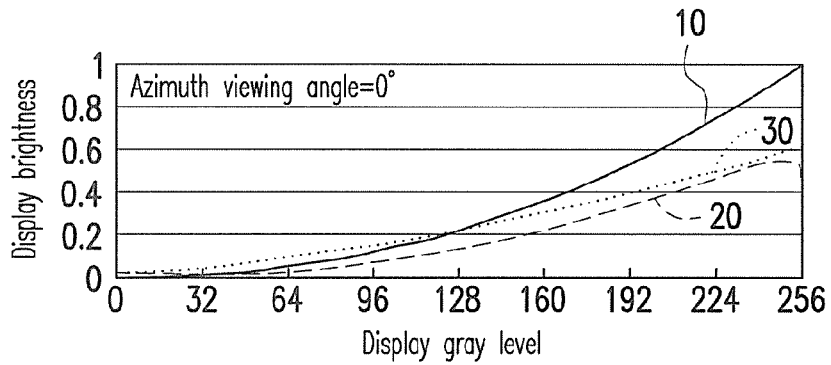
FIG. 5 to FIG. 7 illustrate the relationship between the display gray level and the display brightness when the display panel of this embodiment is in the narrow viewing angle display mode. Here, the display brightness is obtained by taking the maximum brightness at a normal viewing angle as a baseline, and normalizing the measured brightness at a specific viewing angle by the baseline.
Figure 6:
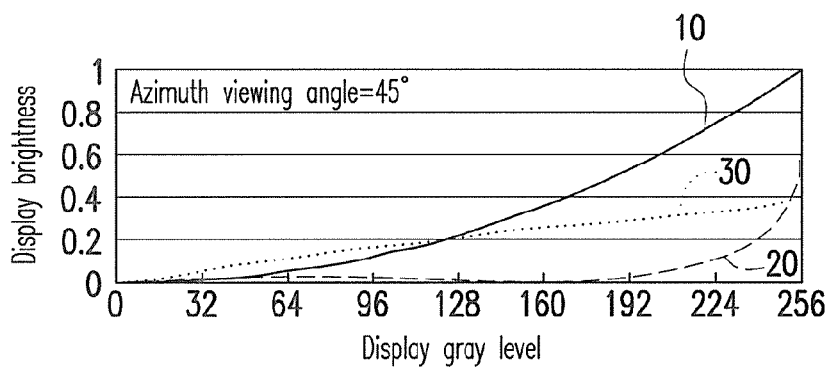
Figure 7:
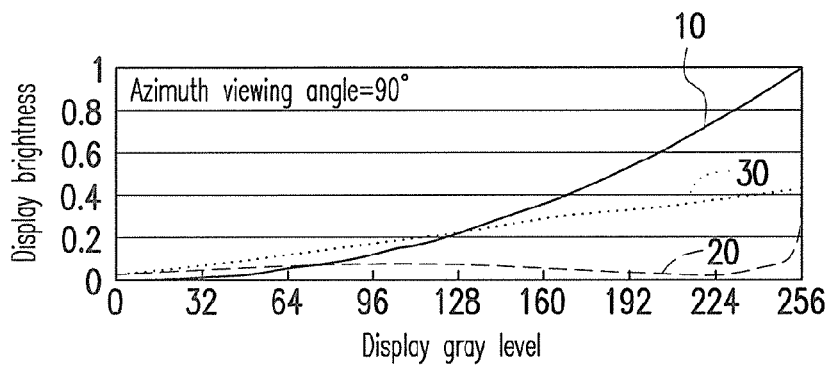

FIG. 5 to FIG. 7 illustrate the relationship between the display gray level and the display brightness when the display panel of this embodiment is in the narrow viewing angle display mode. Here, the display brightness is obtained by taking the maximum brightness at a normal viewing angle as a baseline, and normalizing the measured brightness at a specific viewing angle by the baseline. With reference to FIG. 3 and FIG. 5 to FIG. 7, according to the previous descriptions, in the narrow viewing angle display mode, the enabled sub-pixel areas 212A and 212B in the first and second areas I and II of the display panel 210 may vary. However, owing to the modulation of the driving voltages, the display brightness of the first and second areas I and II at the normal viewing angle is substantially the same. At this time, the gray level distribution and the brightness distribution in the first and second areas I and II at the normal viewing angle are indicated by the curve 10. The curve 20 shown in FIG. 5 to FIG. 7 indicates the relationship between the display gray level and the display brightness when the first area I of the display panel 210 in the narrow viewing angle display mode is at a 60-degree polar viewing angle and a 0-degree, a 45-degree, and a 90-degree azimuth viewing angles approximately. The curve 30 shown in FIG. 5 to FIG. 7 indicates the relationship between the display gray level and the display brightness when the second area II of the display panel 210 in the narrow viewing angle display mode is at the 60-degree polar viewing angle and the 0-degree, the 45-degree, and the 90-degree azimuth viewing angles approximately.

As indicated in FIG. 5 to FIG. 7, when the display panel 210 in the narrow viewing angle display mode, the display brightness of the first area I is significantly changed together with the variation in the azimuth viewing angle. When the display panel 210 is in the narrow viewing angle display mode, the second sub-pixel areas 212B in the first area I are enabled, while the first sub-pixel areas 212A in the first area I are disabled. Hence, the greater the azimuth viewing angle, the darker the first area I. Thereby, other observers in the side viewing angle direction can sense the obvious difference between the display brightness of the first area I and the display brightness of the second area II and thus are not able to obtain the complete image data. As such, the display panel 210 in the narrow viewing angle display mode can accomplish favorable privacy protecting effects.

In details, when the display panel 210 is in the narrow viewing angle display mode, the first and second sub-pixel areas 212A and 212B which are in the second area II and display the normal viewing brightness can selectively have different driving voltages or the same driving voltage. In this embodiment, the first and second sub-pixel areas 212A and 212B are in different rows. Namely, the pixel areas in the same row merely contain the first sub-pixel areas 212A or the second sub-pixel areas 212B. When none of the first sub-pixel areas 212A in the first area I and the second sub-pixel areas 212B in the second area II are enabled, the disabled sub-pixel areas 212A and 212B form clear dark lines at the boundaries of the areas I and II. Alternatively, the enabled sub-pixel areas 212A and 212B form clear bright lines at the boundaries of the areas I and II. The bright lines and the dark lines negatively affect the display quality of the display panel when the user watches the image at the normal viewing angle. Hence, in this embodiment, when the display panel 210 is in the narrow viewing angle display mode, the driving voltages at the first and second sub-pixel areas 212A and 212B in the second area II can be adjusted based on different requirements, such that the ratio of the normal viewing brightness of the first sub-pixel areas 212A to the normal viewing brightness of the second sub-pixel areas 212B is changeable. Thereby, the impact of the bright and dark lines can be lessened.

Figure 8:
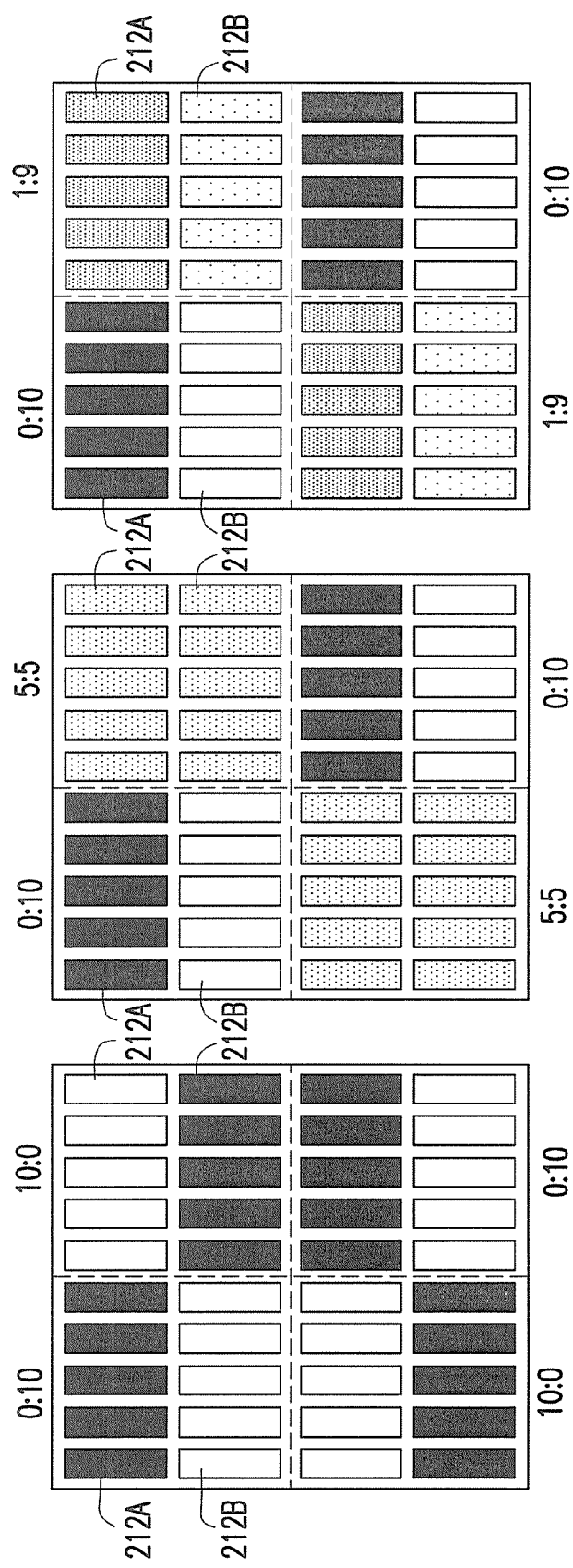
FIG. 8A to FIG. 8C illustrate the brightness distribution when the display panel is in the narrow viewing angle display mode.

For instance, when the display panel 210 is in the narrow viewing angle display mode, only the second sub-pixel areas 212B of the sub-pixel areas 212A and 212B in the first area I are enabled. It is noted that the displayed brightness of the sub-pixels 212A and 212B are determined by the driving voltage applied at the sub-pixels 212A and 212B. By applying proper driving voltages at the first and second sub-pixel areas 212A and 212B in the first area I, the ratio of the normal viewing brightness of the first sub-pixel areas 212A to the normal viewing brightness of the second sub-pixel areas 212B is 0:10 approximately. Besides, by applying proper driving voltages at the first and second sub-pixel areas 212A and 212B in the second area II, the ratio of the nominal viewing brightness of the first sub-pixel areas 212A to the normal viewing brightness of the second sub-pixel areas 212B can be approximately 10:0, 5:5, 1:9, or the like. At this time, the brightness distribution in the display panel is shown in FIG. 8A to FIG. 8C. As indicated in FIG. 8A to FIG. 8C, when the driving voltages at the first and second sub-pixel areas 212A and 212B in the second area II are applied, and the ratio of the normal viewing brightness of the first sub-pixel areas 212A to the normal viewing brightness of the second sub-pixel areas 212B at each gray level is approximately 10:0, the disabled sub-pixel areas 212A and 212B can form the relatively clear bright and dark lines. Here, "0" indicates the dark color and is shown by black in the drawings, while "10" indicates the bright color and is shown by white in the drawings. In addition, the sub-pixel areas 212A and 212B are exemplarily arranged alternately from top to bottom. According to other embodiments of the invention, however, the sub-pixel areas 212A and 212B can also be arranged alternately from right to left, such that satisfactory effects can still be achieved under this configuration. By contrast, when the driving voltages at the first and second sub-pixel areas 212A and 212B in the second area II are applied, and the ratio of the normal viewing brightness of the first sub-pixel areas 212A to the normal viewing brightness of the second sub-pixel areas 212B at each gray level is approximately 5:5 or 1:9, only the first sub-pixel areas 212A in the first area I are disabled, and thus the resultant bright and dark lines are relatively not ambiguous. The above ratio can be adjusted based on the actual requirements in order to ensure the favorable display quality.

Figure 9:
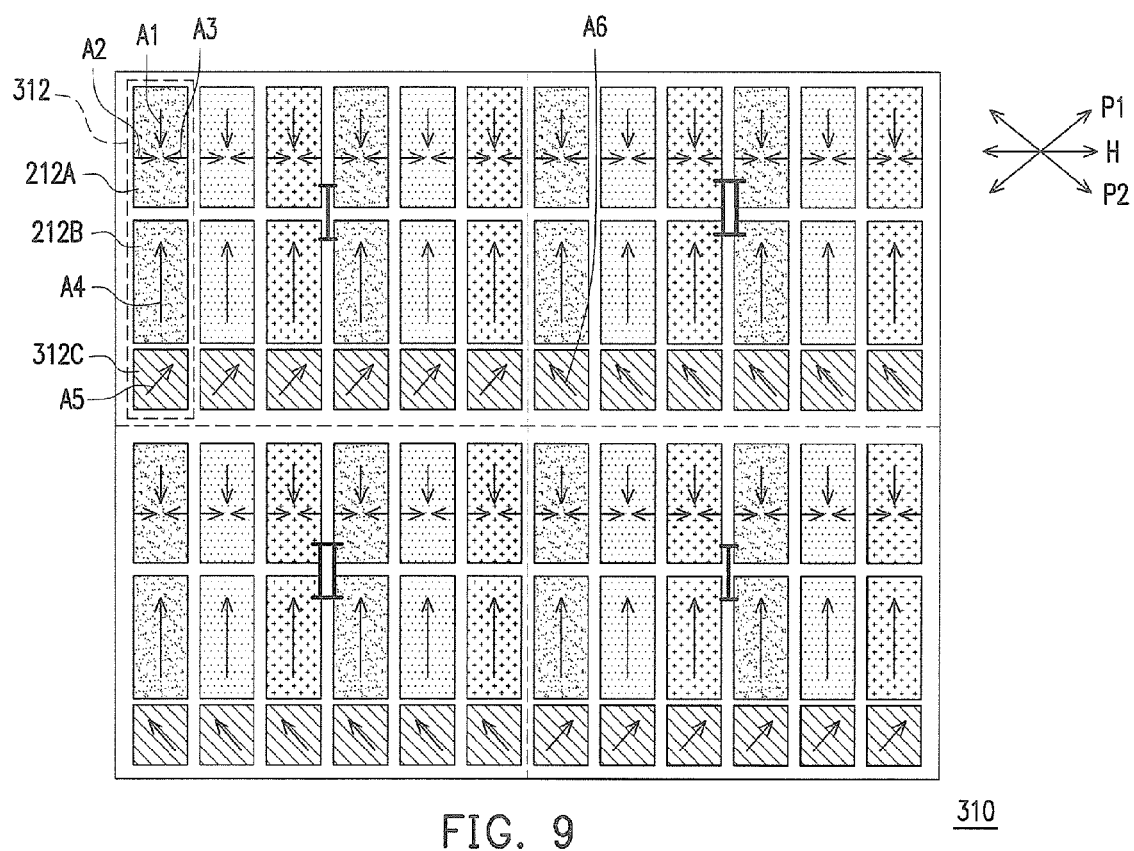
FIG. 9 is a schematic top view illustrating a display panel according to another embodiment of the invention.

FIG. 9 is a schematic top view illustrating a display panel according to another embodiment of the invention. With reference to FIG. 9, the display panel 310 of this embodiment not only has all of the components of the display panel 210 but also has a plurality of third sub-pixel areas 312C. Namely, each of the pixel units 312 of the display panel 310 has a first sub-pixel area 212A, a second sub-pixel area 212B, and a third sub-pixel area 312C. In this embodiment, the first sub-pixel area 212A defines a first alignment direction A1, a second alignment direction A2, and a third alignment direction A3, while the second sub-pixel area 212B defines a fourth alignment direction A4. Besides, the third sub-pixel area 312C in the first area I defines a fifth alignment direction A5, and the third sub-pixel area 312C in the second area II defines a sixth alignment direction A6. That is to say, the third sub-pixel areas 312C in the first and second areas I and II define different alignment directions A5 and A6.

Specifically, the display panel 310 is applicable to the display apparatus 200 depicted in FIG. 2 and can serve as the display panel 202. Hence, the display panel 310 can be disposed between the first polarizer 204 and the second polarizer 206, and the first light-transmission axis direction P1 of the first polarizer 204 is substantially perpendicular to the second light-transmission axis direction P2 of the second polarizer 206. Here, the first light-transmission axis direction P1 intersects the horizontal axis direction H by about 45 degrees. That is to say, when the horizontal axis direction H serves as a baseline (i.e., approximately at 0 degree), the first light-transmission axis direction P1 is approximately at the +45-degree location, and the second light-transmission axis direction P2 is approximately at the 135-degree or the −45-degree location. It should be mentioned that the fifth alignment direction A5 intersects the first light-transmission axis direction P1 by about 0 degree to about 45 degrees, for instance, and the sixth alignment direction A6 intersects the second light-transmission axis direction P2 by about 0 degree to about 45 degrees, for instance.

In an embodiment of the invention, the fifth alignment direction A5 can be parallel to the first light-transmission axis direction P1, and the sixth alignment direction A6 can be parallel to the second light-transmission axis direction P2. Under said layout, the third sub-pixel areas 312C do not provide the brightness in the normal viewing angle direction. Hence, when the display panel 310 is in the wide viewing angle display mode, the third sub-pixel areas 312C are disabled.

However, the invention is not limited thereto. In other embodiments of the invention, the fifth alignment direction A5 is not parallel to the first light-transmission axis direction P1, and the sixth alignment direction A6 is not parallel to the second light-transmission axis direction P2. Here, the third sub-pixel areas 312C can provide brightness in the normal viewing angle direction. Specifically, in the narrow viewing angle display mode, the third sub-pixel areas 312C can additionally provide high brightness in the normal viewing angle direction when the fifth alignment direction A5 intersects the first light-transmission axis direction P1 by about 22.5 degrees and when the sixth alignment direction A6 intersects the second light-transmission axis direction P2 by about 22.5 degrees. However, the brightness distribution in the fifth and sixth alignment directions A5 and A6 at a side viewing angle is different. Therefore, when the display panel 310 is in the wide viewing angle display mode, the third sub-pixel areas 312C are disabled; when the display panel 310 is in the narrow viewing angle display mode, the third sub-pixel areas 312C are enabled, so as to improve the display brightness when the user watches the image displayed on the display panel 310 in the normal viewing angle direction. As a whole, when the display panel 310 is in the wide viewing angle display mode, the first and second sub-pixel areas 212A and 212B can be enabled, while the third sub-pixel areas 312C are disabled.

When the display panel 310 is in the narrow viewing angle display mode, the second and third sub-pixel areas 212B and 312C can be enabled, while the first sub-pixel areas 212A are disabled. At this time, images can only be displayed on the alignment areas having the fourth, fifth, and sixth alignment directions A4, A5, and A6. In other embodiments of the invention, the first sub-pixel areas 212A can be selectively driven by a low driving voltage, and the driving voltage at the first sub-pixel areas 212A is lower than the driving voltage at the second sub-pixel areas 212B. At this time, the images displayed on the display panel 310 have the brightness mainly provided by the alignment areas that have the fourth, fifth, and sixth alignment directions A4, A5, and A6. Therefore, the brightness distribution in the first and second areas I and II is still different, and the privacy protecting effects can be accomplished. It should be mentioned that a vector of the fourth alignment direction A4 along the horizontal axis direction H is zero, and a vector of the fifth alignment direction A5 along the horizontal axis direction H is opposite to a vector of the sixth alignment direction A6 along the horizontal axis direction H. Hence, the normal display brightness of the second sub-pixel areas 212B in the first and second areas I and II is substantially the same.

Based on the orientation of the drawings, the fifth alignment direction A5 is toward the upper-right direction, while the sixth alignment direction A6 is toward the upper-left direction, for instance. Besides, the vector of the fifth alignment direction A5 along the horizontal axis direction H and the vector of the sixth alignment direction A6 along the horizontal axis direction H are substantially compensated. Thereby, in the first area I, the display brightness of the third sub-pixel areas 312C at the left side of the display panel 310 is higher than the display brightness of the third sub-pixel areas 312C at the right side of the display panel 310. By contrast, in the second area II, the display brightness of the third sub-pixel areas 312C at the left side of the display panel 310 is substantially lower than the display brightness of the third sub-pixel areas 312C at the right side of the display panel 310.

Accordingly, when the display panel 310 is in the narrow viewing angle display mode, each of the second and third sub-pixel areas 212B and 312C is enabled. The user located at the left side of the display panel 310 can observe that the display brightness of the first area I is higher than the display brightness of the second area II, and the user located at the right side of the display panel 310 can observe that the display brightness of the second area II is higher than the display brightness of the first area I. Thereby, the privacy protecting effects can be accomplished. In addition, due to the control of the driving voltages, the third sub-pixel areas 312C in the first and second areas I and II around the normal viewing angle have substantially the same display brightness. As a result, the user in the normal viewing angle direction can observe that the display brightness of the first and second areas I and II is substantially the same, and thus the user is not apt to feel dizzy. In other words, the display panel 310 can simultaneously perform the privacy protecting function and achieve the favorable display effects in the normal viewing angle direction when the display panel 310 is in the narrow viewing angle display mode. Note that the directional terminology including "up," "down," "left," and "right" described in this embodiment and other embodiments of the invention is used with reference to the orientation of the drawings and should not be construed as a limitation to the invention. Specifically, when the drawings are turned upside down, the directional terminology including "up," "down," "left," and "right" will be interpreted in an opposite way, such that the adjusted orientation for achieving the privacy protecting effects is opposite to the original orientation. Practically, the display panel can be placed based on the requirement of the designer, i.e., based on the orientation for achieving the privacy protecting effects.

In order to respectively drive the sub-pixel areas 212A, 212B, and 312C, one data line and three scan lines in the display panel 310 can be applied to drive each of the pixel units 312. Alternatively, two data lines and two scan lines in the display panel 310 can be applied to drive each of the pixel units 312. However, to simplify the layout design of each pixel unit 312, one data line and two scan lines are utilized in this embodiment to drive each pixel unit 312, which is exemplified below.

Figure 10:
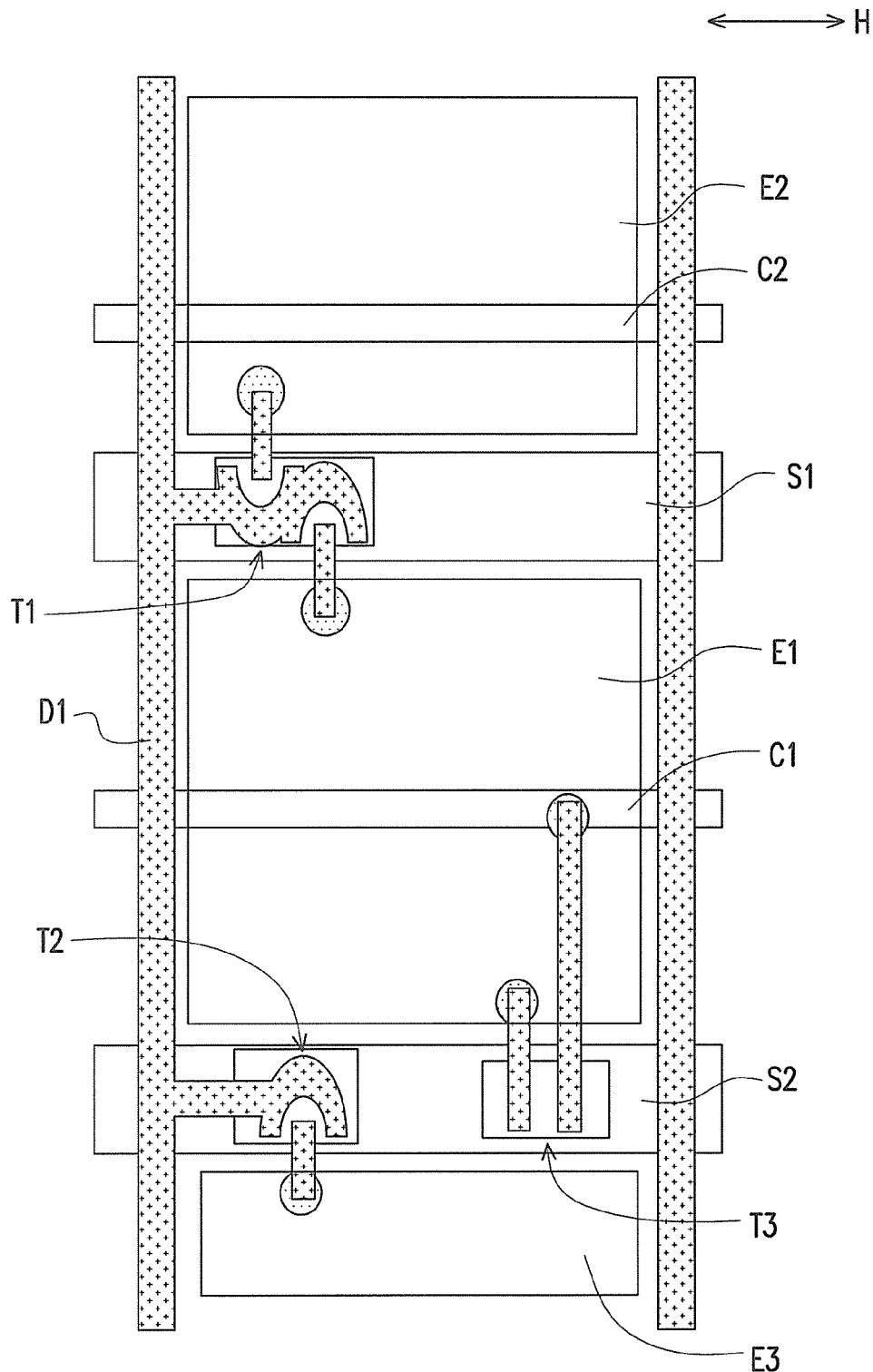
FIG. 10 is a schematic view illustrating a layout of a pixel unit according to an embodiment of the invention.

FIG. 10 is a schematic view illustrating a layout of a pixel unit according to an embodiment of the invention. With reference to FIG. 9 and FIG. 10, each of the pixel units 312 includes a first scan line S1, a second scan line S2, a common line C1, a data line D1, a first pixel electrode E1, a second pixel electrode E2, a third pixel electrode E3, a first active device T1, a second active device T2, and a third active device T3.

The first scan line S1, the second scan line S2, and the common line C1 are parallel to the horizontal axis direction H. The data line D1 intersects the first scan line S1, the second scan line S2, and the common line C1. The first pixel electrode E1 defines the first sub-pixel area 212A. The second pixel electrode E2 defines the second sub-pixel area 212B. The third pixel electrode E3 defines the third sub-pixel area 312C. Besides, the first scan line S1 is located between the first pixel electrode E1 and the second pixel electrode E2, and the second scan line S2 is located between the first pixel electrode E1 and the third pixel electrode E3. However, the invention is not limited thereto. In other embodiments of the invention, the first scan line S1, the second scan line S2, and the common line C1 can be selectively perpendicular to the horizontal axis direction H, while the data line D1 is parallel to the horizontal axis direction H.

The first active device T1 is driven by the first scan line S1 and connected to the data line D1, the first pixel electrode E1, and the second pixel electrode E2. Here, the first active device T1 can be a dual-drain thin film transistor (TFT) or can be constituted by two TFTs. When the first active device T1 is the dual-drain TFT, the two drains can be respectively connected to the first pixel electrode E1 and the second pixel electrode E2, while the two pixel electrodes E1 and E2 can be connected to one source. When the first active device T1 is constituted by two TFTs, the source of the first TFT is connected to the data line D1, and the drain of the first TFT is connected to the first pixel electrode E1. Meanwhile, the source of the second TFT is connected to the source of the first TFT, and the drain of the second TFT is connected to the second pixel electrode E2. The second active device T2 is driven by the second scan line S2 and connected to the data line D1 and the third pixel electrode E3. The third active device T3 is also driven by the second scan line S2 and connected to the common line C1 and the first pixel electrode E1. Namely, the source of the third active device T3 is connected to the first pixel electrode E1, and the drain of the third active device T3 is connected to the common line C1. Based on the above, the first pixel electrode E1 can be controlled by the two active devices T1 and T2. The common line C1 can be overlapped with the first pixel electrode E1, so as to form the required storage capacitor. Besides, another common line C2 and the second pixel electrode E2 can also be overlapped in the invention to form the storage capacitor. According to this embodiment, the first pixel electrode E1, the second pixel electrode E2, and the third pixel electrode E3 are separated from one another and have individual patterns.

By way of alignment slits, alignment protrusions, or the like, the display panel 310 of this embodiment can define the first alignment direction A1, the second alignment direction A2, and the third alignment direction A3 in the first pixel electrode E1, define the fourth alignment direction A4 in the second pixel electrode E2, and define the fifth alignment direction A5 or the sixth alignment direction A6 in the third pixel electrode E3. That is to say, the region where the first pixel electrode E1 is located is substantially the first sub-pixel area 212A, the region where the second pixel electrode E2 is located is substantially the second sub-pixel area 212B, and the region where the third pixel electrode E3 is located is substantially the third sub-pixel area 312C.

Specifically, according to the layout shown in FIG. 10, each of the pixel units 312 can be driven on the following condition: when the display panel 310 is in the wide viewing angle display mode, the second scan line S2 is enabled before the first scan line S1 is enabled. As such, when the display panel 310 is in the wide viewing angle display mode, the second active device T2 is turned on, such that the voltage transmitted via the data line D1 can be further transmitted to the third pixel electrode E3, and the third active device T3 is also turned on, such that the voltage transmitted via the common line C1 can be further transmitted to the first pixel electrode E1. The first scan line S1 then turns on the first active device T1, such that the voltage transmitted via the data line D1 is further transmitted to the first pixel electrode E1 and the second pixel electrode E2. At this time, a common voltage can be input to the first pixel electrode E1, and then the display voltage transmitted via the data line D1 is input to the first pixel electrode E1 for displaying images.

In the wide viewing angle display mode, when the second scan line S2 turns on the second active device T2, the voltage transmitted via the data line D1 can determine whether the third pixel electrode E3 displays images or not. The alignment directions A5 and A6 defined in the third pixel electrode E3 in the third sub-pixel area 312C are different corresponding to the different areas I and II. The images are not displayed on the third sub-pixel areas 312C in order to achieve the wide viewing angle display mode. Hence, when the second scan line S2 turns on the second active device T2, a dark voltage or a common voltage can be transmitted via the data line D1.

When the display panel 310 is in the narrow viewing angle display mode, the first scan line S1 is enabled before the second scan line S2 is enabled. As such, when the first scan line S1 is enabled, the display voltage transmitted via the data line D1 can be input to the second pixel electrode E2 and the first pixel electrode E1 through the first active device T1. When the second scan line S2 is then enabled, the common voltage on the common line C1 is transmitted to the first pixel electrode E1 through the third active device T3. The display voltage is applied to the first pixel electrode E1 for a short period of time. The common voltage is applied to the first pixel electrode E2 for the rest of time, and thus the first pixel electrode E1 does not display images within this time frame. Note that the above-mentioned display method is exemplarily provided under the layout depicted in the FIG. 10, which should not be construed as a limitation to the invention.

Figure 11:
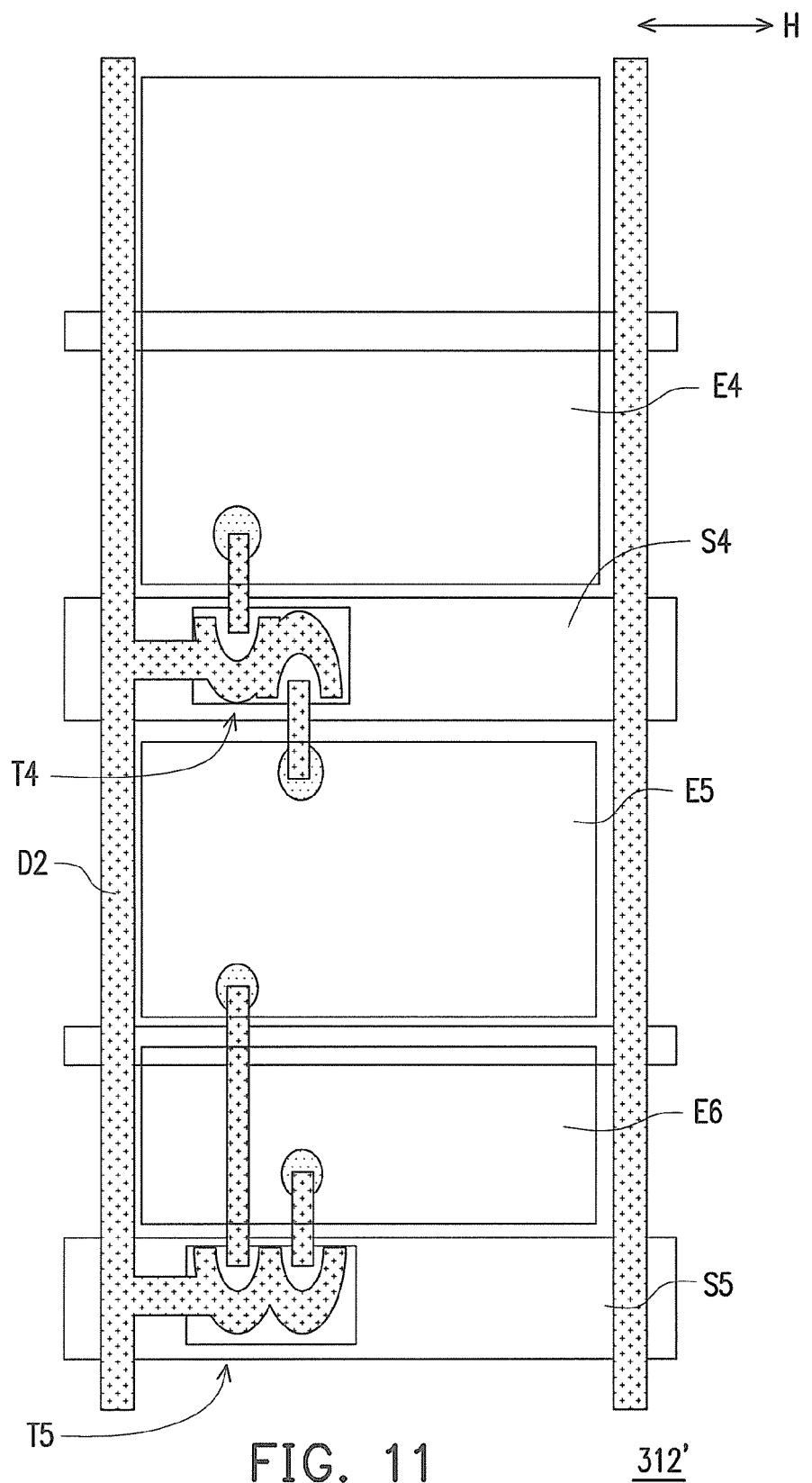
FIG. 11 is a schematic view illustrating a layout of a pixel unit according to another embodiment of the invention.

FIG. 11 is a schematic view illustrating a layout of pixel units according to another embodiment of the invention. With reference to FIG. 9 and FIG. 11, a pixel unit 312' includes a first scan line S4, a second scan line S5, a data line D2, a first pixel electrode E4, a second pixel electrode E5, a third pixel electrode E6, a first active device T4, and a second active device T5, for instance. Similarly, the first scan line S4 and the second scan line S5 are parallel to the horizontal axis direction H. The data line D2 intersects the first scan line S4 and the second scan line S5. The first pixel electrode E4 defines the first sub-pixel area 212A. The second pixel electrode E5 defines the second sub-pixel area 212B. The third pixel electrode E6 defines the third sub-pixel area 312C. However, the invention is not limited thereto. In other embodiments of the invention, the first scan line S4 and the second scan line S5 can be selectively perpendicular to the horizontal axis direction H, while the data line D2 is parallel to the horizontal axis direction H.

Specifically, the first scan line S4 is located between the first pixel electrode E4 and the second pixel electrode E5, and the third pixel electrode E6 is located between the second pixel electrode E5 and the second scan line S5. The first active device T4 is driven by the first scan line S4 and connected to the data line D2, the first pixel electrode E4, and the second pixel electrode E5. The second active device T5 is driven by the second scan line S5 and connected to the data line D2, the second pixel electrode E5, and the third pixel electrode E6. In this embodiment, the first active device T4 simultaneously controls the first pixel electrode E4 and the second pixel electrode E5, and the second active device T5 simultaneously controls the second pixel electrode E5 and the third pixel electrode E6. Here, each of the first active device T1 and the second active device T2 can be a dual-drain TFT or can be constituted by two TFTs. That is to say, when the first active device T4 is the dual-drain TFT, the two drains can be respectively connected to the first pixel electrode E4 and the second pixel electrode E5, while the two pixel electrodes E4 and E5 are connected to one source. When the first active device T4 is constituted by two TFTs, the source of the first TFT is connected to the data line D2, and the drain of the first TFT is connected to the first pixel electrode E4. The source of the second TFT is connected to the source of the first TFT, and the drain of the second TFT is connected to the second pixel electrode E5. When the second active device T5 is the dual-drain TFT, the two drains can be respectively connected to the second pixel electrode E5 and the third pixel electrode E6, while the two pixel electrodes E5 and E6 are connected to one source. When the second active device T5 is constituted by two TFTs, the source of the first TFT is connected to the data line D2, and the drain of the first TFT is connected to the second pixel electrode E5. The source of the second TFT is connected to the source of the first TFT, and the drain of the second TFT is connected to the third pixel electrode E6. According to this embodiment, the first pixel electrode E4, the second pixel electrode E5, and the third pixel electrode E6 are separated from one another and have individual patterns.

When the display panel 310 is in the wide viewing angle display mode, the second scan line S5 and the first scan line S4 are sequentially enabled. Specifically, in the wide viewing angle display mode, the second scan line S5 turns on the second active device T5, such that the voltage on the data line D2 is transmitted to the second pixel electrode E5 and the third pixel electrode E6. Since the dark voltage or the common voltage is transmitted via the data line D2, the second pixel electrode E5 and the third pixel electrode E6 do not display images. The second scan line S5 then turns on the first active device T4, such that the voltage transmitted via the data line D2 is further transmitted to the first pixel electrode E4 and the second pixel electrode E5. At this time, the data line D2 transmits the display voltage, and the voltage at the second pixel electrode E5 is renewed, such that the second pixel electrode E5 displays images. In other words, no matter the voltage transmitted via the data line D2 is a display voltage, a dark voltage, or a common voltage when the second active device T5 is turned on, the second pixel electrode E5 can display images after the first active device T4 is turned on. Hence, in the wide viewing angle display mode, the first and second pixel electrodes E4 and E5 can display images, while the third pixel electrode E6 does not display images.

By contrast, when the display panel 310 is in the narrow viewing angle display mode, the first scan line S4 and the second scan line S5 are sequentially enabled. At this time, the first scan line S4 is enabled, and a dark voltage is transmitted via the data line D2. Thereby, the first and second pixel electrodes E4 and E5 receive the dark voltage on the data line D2 and thus do not display images. When the second scan line S5 is then enabled, the second and third pixel electrodes E5 and E6 receive the display voltage on the data line D2 and display images. Namely, according to this embodiment, the wide viewing angle display mode and the narrow viewing angle display mode can be switched when the order of enabling the first and second scan lines S4 and S5 is modified.

Figure 12:
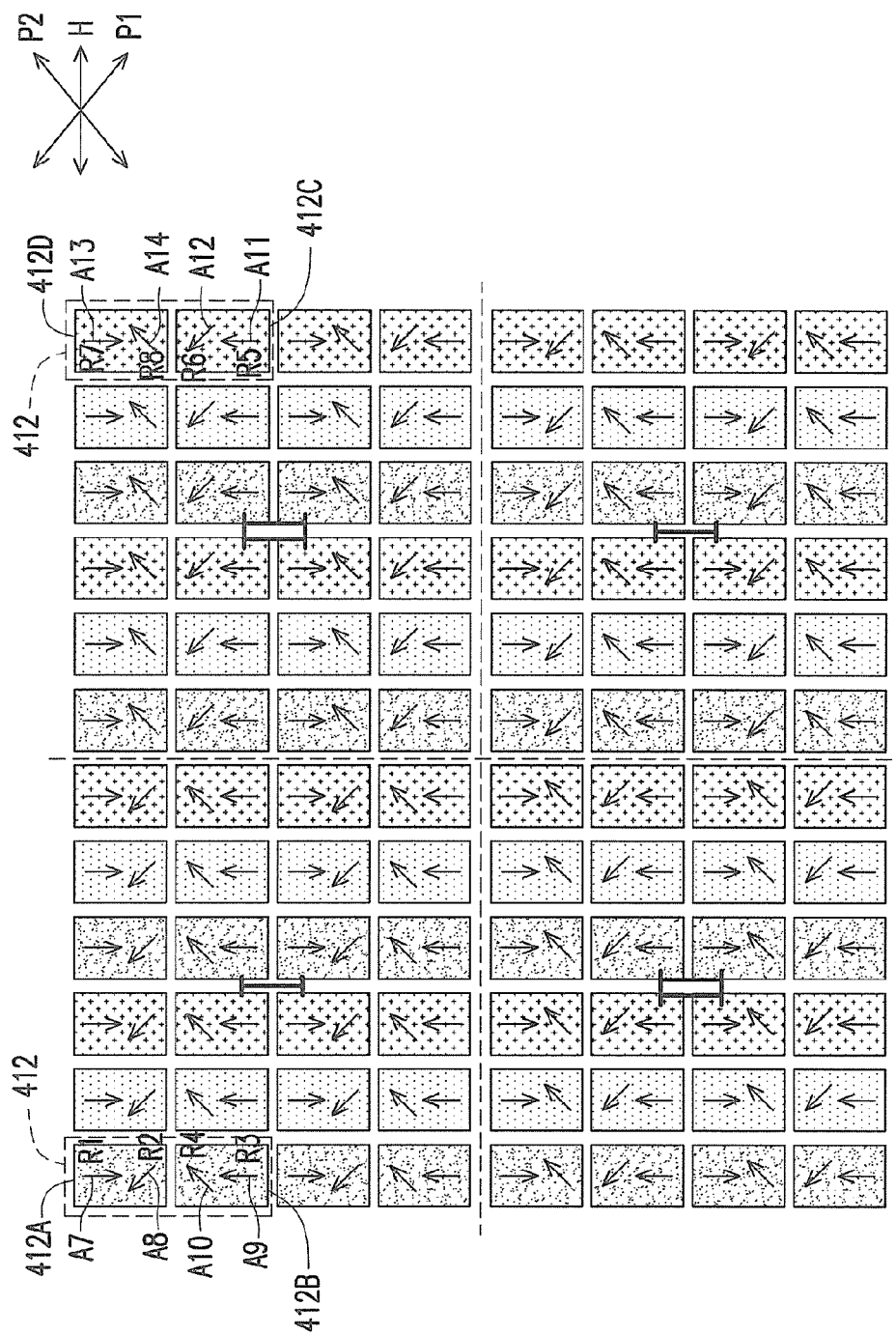
FIG. 12 is a schematic view illustrating a display panel according to another embodiment of the invention.

FIG. 12 is a schematic view illustrating a display panel according to another embodiment of the invention. With reference to FIG. 12, similar to the display panels 210 and 310, the display panel 410 is disposed between a first polarizer (not shown) and a second polarizer (not shown). A first light-transmission axis direction P1 of the first polarizer is substantially perpendicular to a second light-transmission axis direction P2 of the second polarizer. The first light-transmission axis direction P1 intersects a horizontal axis direction H by about 45 degrees. The definition of the light-transmission axis directions P1 and P2 and the horizontal axis direction H is provided in the previous embodiments. The display panel 410 has at least one first area I and at least one second area II. The first area I and the second area II respectively have a plurality of pixel units 412 arranged in arrays, and a row direction of the pixel units 412 is parallel to the horizontal axis direction H.

In this embodiment, each of the pixel units 412 in the first area I has a first sub-pixel area 412A and a second sub-pixel area 412B, and each of the pixel units 412 in the second area II has a first sub-pixel area 412C and a second sub-pixel area 412D. Each of the sub-pixel areas 412A, 412B, 412C, and 412D has two alignment areas providing two alignment directions. Each of the pixel units 412 has four different alignment directions, and thereby the wide viewing angle effect can be achieved when each of the pixel units 412 is enabled. Each of the pixel units 412 in the first and second areas I and II is described below.

In the first area I, the first sub-pixel area 412A includes a first alignment area R1 and a second alignment area R2. A first alignment direction A7 of the first alignment area R1 is substantially perpendicular to the horizontal axis direction H. A second alignment direction A5 of the second alignment area R2 intersects the first light-transmission axis direction P1 by about 0 degree to about 45 degrees, and the second alignment direction A8 is not perpendicular to the horizontal axis direction H.

Based on the orientation of the drawings, the first alignment direction A7 is toward the bottom, while the second alignment direction A8 is toward the upper-left direction, for instance. However, when the display panel 410 is turned upside down, the first alignment direction A7 can be toward the top, while the second alignment direction A8 can be toward the lower-right direction. Namely, the directional terminology including "up," "down," "left," and "right" described in this embodiment is used with reference to the orientation of the drawings to explain the relative locations of the components, which should not be construed as a limitation to the invention.

The second sub-pixel area 412B includes a third alignment area R3 and a fourth alignment area R4. A third alignment direction A9 of the third alignment area R3 is substantially perpendicular to the horizontal axis direction H, and the third alignment direction A9 is opposite to the first alignment direction A7. Namely, in this embodiment, the third alignment direction A9 is toward the top, for instance. A fourth alignment direction A10 of the fourth alignment area R4 intersects the second light-transmission axis direction P2 by about 0 degree to about 45 degrees, and the fourth alignment direction A10 is not perpendicular to the horizontal axis direction H. Here, the fourth alignment direction A10 is toward the upper-right direction, for instance.

In this embodiment, the second and fourth alignment directions A8 and A10 are respectively toward the upper-left and upper-right directions. An acute angle between the second and fourth alignment directions A8 and A10 can range from about 45 degrees to about 90 degrees. Besides, a vector of the second alignment direction A8 along the horizontal axis direction H and a vector of the fourth alignment direction A10 along the horizontal axis direction H can be substantially compensated, which should not be construed as a limitation to the invention. Therefore, the display brightness of the second alignment area R2 along the horizontal axis direction H is substantially the same as the display brightness of the fourth alignment area R4 along the horizontal axis direction H. When the alignment areas R1~R4 are all enabled, the display brightness of the alignment areas R1~R4 is substantially the same at any viewing angle.

In the second area II, the first sub-pixel area 412C includes a first alignment area R5 and a second alignment area R6. A first alignment direction A11 of the first alignment area R5 is substantially perpendicular to the horizontal axis direction H. Here, the first alignment direction A11 is toward the top, for instance. A second alignment direction A12 of the second alignment area R6 intersects the first light-transmission axis direction P1 by about 0 degree to about 45 degrees, and the second alignment direction A12 is not perpendicular to the horizontal axis direction H. Here, the second alignment direction A12 is toward the upper-left direction, for instance.

Similarly, the second sub-pixel area 412D in the second area II includes a third alignment area R7 and a fourth alignment area R8. A third alignment direction A13 of the third alignment area R7 is substantially perpendicular to the horizontal axis direction H, and the third alignment direction A13 is opposite to the first alignment direction A11. Namely, the third alignment direction A13 is toward the bottom, for instance. A fourth alignment direction A14 of the fourth alignment area R8 intersects the second light-transmission axis direction P2 by about 0 degree to about 45 degrees, and the fourth alignment direction A14 is not perpendicular to the horizontal axis direction H. Here, the fourth alignment direction A14 is toward the upper-right direction, for instance.

in this embodiment, the second and fourth alignment directions A12 and A14 are respectively toward the upper-left and upper-right directions. Besides, the vector of the second alignment direction A12 along the horizontal axis direction H and the vector of the fourth alignment direction A14 along the horizontal axis direction H are substantially compensated. Therefore, the display brightness of the second alignment area R6 along the horizontal axis direction H is substantially the same as the display brightness of the fourth alignment area R8 along the horizontal axis direction H. An acute angle between the second and fourth alignment directions A12 and A14 can range from about 45 degrees to about 90 degrees.

In this embodiment, the first alignment direction A7 defined by the first sub-pixel area 412A in the first area I is substantially the same as the third alignment direction A13 defined by the second sub-pixel area 412D in the second area II (i.e., toward the bottom). The second alignment direction A8 defined by the first sub-pixel area 412A in the first area I is substantially the same as the second alignment direction A12 defined by the first sub-pixel area 412C in the second area II (i.e., toward the upper-left direction). The third alignment direction A9 defined by the second sub-pixel area 412B in the first area I is substantially the same as the first alignment direction A11 defined by the first sub-pixel area 412C in the second area II (i.e., toward the top). The fourth alignment direction A10 defined by the second sub-pixel area 412B in the first area I is substantially the same as the fourth alignment direction A14 defined by the second sub-pixel area 412D in the second area II (i.e., toward the upper-right direction).

The first sub-pixel areas 412A in the first area I and the second sub-pixel areas 412D in the second area II are in the same row, and the second sub-pixel areas 412B in the first area I and the first sub-pixel areas 412C in the second area II are in the same row. In the first area I, the second alignment area R2 is located between the first alignment area R1 and the second sub-pixel areas 412B in the next row. In the second area II, the second alignment area R6 is located between the first alignment area R5 and the second sub-pixel areas 412D in the previous row. However, the above-mentioned layout should not be construed as a limitation to the invention, and the relative locations of alignment areas R1~R8 can be adjusted based on the pixel design according to other embodiments of the invention.

When the display panel 410 is in a narrow viewing angle display mode (i.e., when the privacy protection function is to be performed), a driving voltage at the second sub-pixel areas 412B in the first area I is substantially higher than a driving voltage at the first sub-pixel areas 412A in the first area I, and a driving voltage at the first sub-pixel areas 412C in the second area II is substantially higher than a driving voltage at the second sub-pixel areas 412D in the second area II. That is to say, when the display panel 410 is in the narrow viewing angle display mode (i.e., when the privacy protection function is to be performed), the display brightness of the first sub-pixel areas 412A in the first area I is lower than the predetermined display brightness. Similarly, the display brightness of the second sub-pixel areas 412D in the second area II is lower than the predetermined display brightness. Particularly, in an embodiment of the invention, the driving voltage at the second sub-pixel areas 412B in the first area I can be substantially equal to the driving voltage at the first sub-pixel areas 412A in the second area II. In other words, the display brightness of the second sub-pixel areas 412B in the first area I and the display brightness of the first sub-pixel areas 412A in the second area II can both reach the predetermined display brightness. According to other embodiments of the invention, the first sub-pixel areas 412A in the first area I and the second sub-pixel areas 412D in the second areas II are disabled, and the second sub-pixel areas 412B in the first area I and the first sub-pixel areas 412C in the second area II are enabled.

At this time, in the first area I, the third alignment area R3 that has the alignment direction toward the top and the fourth alignment area R4 that has the alignment direction toward the upper-right direction can provide the required brightness for displaying images. Likewise, in the second area II, the first alignment area R5 that has the alignment direction toward the top and the second alignment area R6 that has the alignment direction toward the upper-left direction can provide the required brightness for displaying images. Therefore, in the narrow viewing angle display mode, the user located at the right of the display panel 410 can observe that the display brightness of the first area I is lower than the display brightness of the second area II. The user located at the left of the display panel 410 can observe that the display brightness of the first area I is higher than the display brightness of the second area II. Under said layout and based on the aforesaid display method, the display panel 410 can perform the privacy protecting function.

Alternatively, in other embodiments of the invention, the first sub-pixel areas 412A in the first area I and the second sub-pixel areas 412D in the second area II can be enabled. However, the driving voltage at the enabled first sub-pixel areas 412A in the first area I is lower than the driving voltage at the enabled second sub-pixel areas 412B in the first area I, and the driving voltage at the enabled second sub-pixel areas 412D in the second area II is lower than the driving voltage at the enabled first sub-pixel areas 412C in the second area II. As such, the display brightness of the first area I is still different from the display brightness of the second area II in the display panel 410, so as to accomplish the privacy protecting effects.

In another embodiment that is not shown in the drawings, the vector of the second alignment directions A8 and A12 along the first alignment directions A7 and A11 can be zero, and the vector of the fourth alignment directions A10 and A14 along the third alignment directions A9 and A13 can be zero as well. That is to say, the second alignment directions A8 and A12 and the fourth alignment directions A10 and A14 are parallel to the horizontal axis direction H, for instance. Here, the second alignment directions A8 and A12 are exactly toward the left, and the fourth alignment directions A10 and A14 are exactly toward the right, for instance. At this time, in the narrow viewing angle display mode, the user located at the right of the display panel 410 can barely observe the display brightness of the first area I because only the second sub-pixel areas 412B in the first area I are enabled. Similarly, in the narrow viewing angle display mode, the user located at the left of the display panel 410 can barely observe the display brightness of the second area II because only the first sub-pixel areas 412C in the second area II are enabled. Notwithstanding the parallax, the display panel 410 can achieve favorable privacy protecting effects under said layout.

Nonetheless, if the fourth alignment directions A10 and A14 and the second alignment directions A8 and A12 are not parallel to the second light-transmission axis direction P2 and the first light-transmission axis direction P1, the fourth alignment areas R4 and R8 and the second alignment areas R2 and R6 can provide the display brightness around the normal viewing angle direction. Specifically, when the second alignment directions A8 and A12 intersect the first light-transmission axis direction P1 by 22.5 degrees, and the fourth alignment directions A10 and A14 intersect the second light-transmission axis direction P2 by 22.5 degrees, the display brightness of the fourth alignment areas R4 and R8 and the second alignment areas R2 and R6 can be relatively high around the normal viewing angle direction.

At this time, in the narrow viewing angle display mode, the user in the normal viewing angle direction observes the image with the brightness provided by the third, fourth, first, and second alignment areas R3, R4, R5, and R6. In this embodiment, the difference in the display brightness of the fourth and second alignment areas R4 and R6 in the horizontal axis direction H around the normal viewing angle is not significant, and thus the user at the normal viewing angle can observe that the display brightness of the first area I is substantially the same as the display brightness of the second area II. Thereby, the user is not apt to feel dizzy. To sum up, the display panel 410 of this embodiment not only can perform the privacy protecting function when the display panel 410 is in the narrow viewing angle display mode but also can achieve the satisfactory visual effects when the user watches the image at the normal viewing angle.

On the contrary, if the fourth alignment directions A10 and A14 and the second alignment directions A8 and A12 are parallel to the second light-transmission axis direction P2 and the first light-transmission axis direction P1, respectively, the fourth alignment areas R4 and R8 and the second alignment areas R2 and R6 do not provide the display brightness around the normal viewing angle. At this time, in the narrow viewing angle display mode, the user in the normal viewing angle direction observes the image with the brightness provided by the third and first alignment areas R3 and R5. Here, the alignment directions of the third and first alignment areas R3 and R5 are toward the top, and thus the display brightness distribution of the third and first alignment areas R3 and R5 along the horizontal axis direction H is substantially the same. Accordingly, the user at the normal viewing angle can still observe that the display brightness of the first area I is substantially the same as the display brightness of the second area II, and thus the user is not apt to feel dizzy.

When the display panel 410 is in the wide viewing angle display mode, the first and second sub-pixel areas 412A and 412B are enabled. That is to say, all of the pixel units 412 are enabled when the display panel 410 is in the wide viewing angle display mode. At this time, each of the pixel units 412 can provide four different alignment directions, the display panel 410 can achieve the wide viewing angle display effect. The user is able to obtain the complete image data no matter the user watches the image in the normal viewing angle direction or in the side viewing angle direction.

Figure 13:
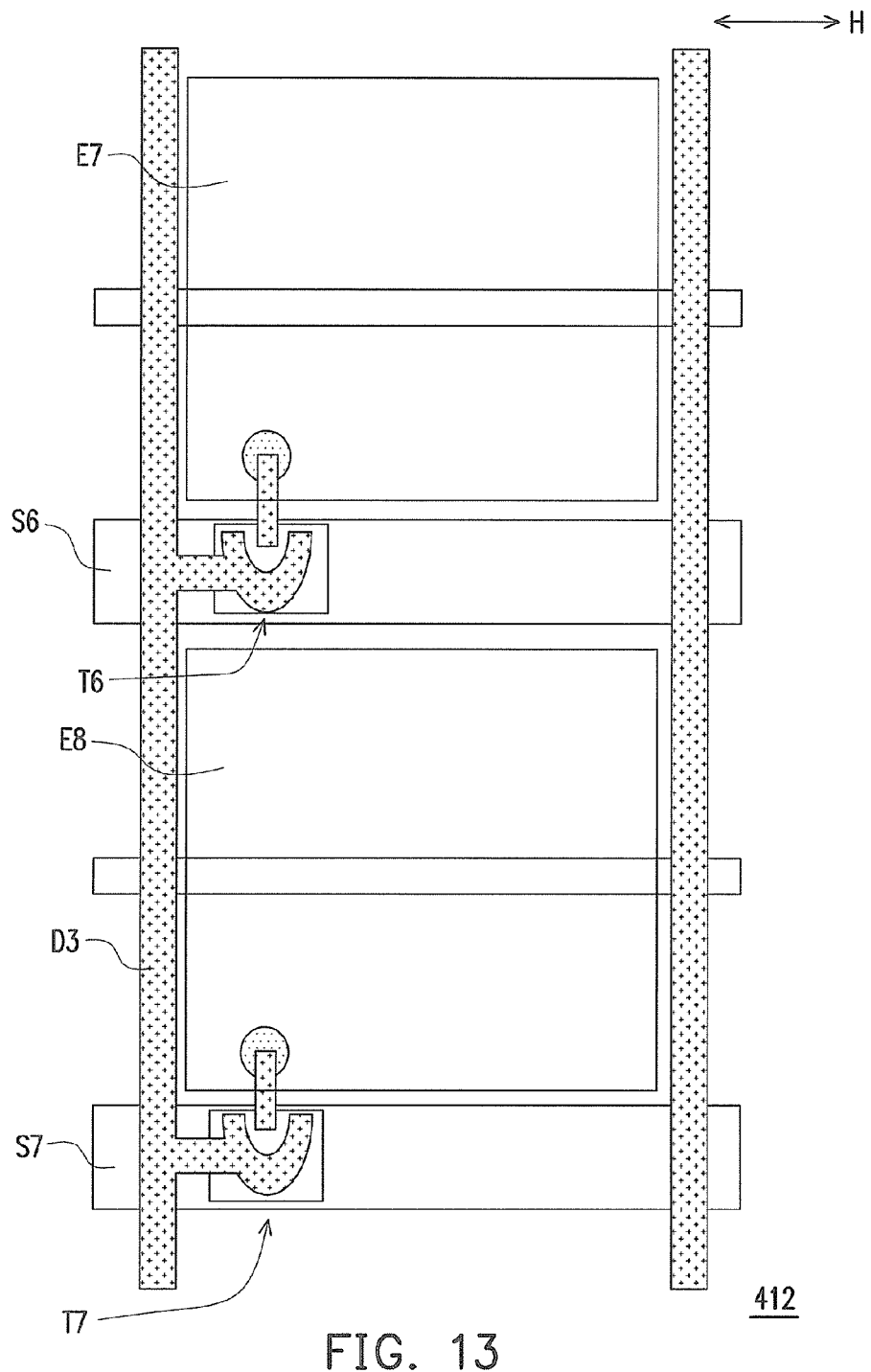
FIG. 13 is a schematic view illustrating a layout of a pixel unit according to an embodiment of the invention.

FIG. 13 is a schematic view illustrating a layout of a pixel unit according to an embodiment of the invention. With reference to FIG. 13, the pixel unit 412 of this embodiment includes a first scan line S6, a second scan line S7, a data line D3, a first pixel electrode E7, a second pixel electrode E8, a first active device T6, and a second active device T7. The first scan line S6 and the second scan line S7 are respectively parallel to the horizontal axis direction H. The data line D3 intersects the first scan line S6 and the second scan line S7. The first active device T6 is driven by the first scan line S6 and connected to the data line D3 and the first pixel electrode E7. The second active device T7 is driven by the second scan line S7 and connected to the data line D3 and the second pixel electrode E8. According to this embodiment, the first pixel electrode E7 and the second pixel electrode E8 are separated from each other and have individual patterns. However, the invention is not limited thereto. In other embodiments of the invention, the first scan line S6 and the second scan line S7 can be selectively perpendicular to the horizontal axis direction H, while the data line D3 is parallel to the horizontal axis direction H.

When the pixel unit 412 shown in FIG. 13 is disposed in the first area I shown in FIG. 12, the first pixel electrode E7 defines the first sub-pixel areas 412A and includes the first alignment area R1 and the second alignment area R2, and the second pixel electrode E8 defines the second sub-pixel areas 412B and includes the third alignment area R3 and the fourth alignment area R4. When the pixel unit 412 shown in FIG. 13 is disposed in the second area II shown in FIG. 12, the first pixel electrode E7 defines the first sub-pixel areas 412C and includes the first alignment area R5 and the second alignment area R6, and the second pixel electrode E8 defines the second sub-pixel areas 412D and includes the third alignment area R7 and the fourth alignment area R8.

The first pixel electrode E7 and the second pixel electrode E8 of this embodiment are respectively controlled by the first active device T6 and the second active device T7. Hence, in the first area I, the first sub-pixel areas 412A and the second sub-pixel areas 412B are individually driven; in the second area II, the first sub-pixel areas 412C and the second sub-pixel areas 412D are individually driven. One of the first and second sub-pixel areas 412A and 412B in the first area I is enabled, and one of the first and second sub-pixel areas 412C and 412D in the second area II is enabled. As such, when the display panel 410 is in the narrow viewing angle display mode, the corresponding sub-pixel areas can be selectively enabled, so as to perform the privacy protecting function. By contrast, when the display panel 410 is in the wide viewing angle display mode, the first and second sub-pixel areas 412A and 412B in the first area I and the first and second sub-pixel areas 412C and 412D in the second area II are all enabled, so as to achieve the wide viewing angle display effect.

In light of the foregoing, by way of the layout of the alignment areas, the display brightness of different alignment areas in different viewing angle directions can be adjusted when the light-transmission axis directions of the polarizers intersect the horizontal axis direction by about 45 degrees. Hence, when certain alignment areas in different areas of the display panel are enabled, the display panel can be in the narrow viewing angle display mode. The user located at the normal viewing angle can obtain the complete display image data, while the user at a side viewing angle direction or a polar viewing angle can merely observe unclear display image. As such, when the display panel is in the narrow viewing angle display mode, the privacy protection effects can be achieved. Besides, due to the layout of alignment areas, when the display panel is in the narrow viewing angle display mode, the display brightness in different areas of the display panel around the normal viewing angle direction is substantially the same. Even though the user observes the image displayed on the display panel at an angle slightly away from the normal viewing angle direction, the display brightness in different areas is substantially the same, and thus the user is not apt to feel dizzy. In other words, the display apparatus not only can perform the privacy protecting function but also can achieve the favorable display effects in the normal viewing angle direction when the display panel is in the narrow viewing angle display mode.

It will be apparent to those skilled in the art that various modifications and variations can be made to the structure of the invention without departing from the scope or spirit of the invention. In viewing of the foregoing, it is intended that the invention cover modifications and variations of this invention provided they fall within the scope of the following claims and their equivalents.

What is claimed is:

1. A display apparatus comprising:
a display panel disposed between a first polarizer and a second polarizer, a first light-transmission axis direction of the first polarizer being substantially perpendicular to a second light-transmission axis direction of the second polarizer, the first light-transmission axis direction intersecting a horizontal axis direction by approximately 45 degrees, the display panel having at least one first area and at least one second area, the at least one first area and the at least one second area respectively having a plurality of pixel units arranged in arrays, a row direction of the pixel units being substantially parallel to the horizontal axis direction, each of the pixel units having:
a first sub-pixel area comprising a first alignment area, a second alignment area, and a third alignment area, a first alignment direction of the first alignment area being substantially perpendicular to the horizontal axis direction; and
a second sub-pixel area, the second sub-pixel area being a fourth alignment area, a fourth alignment direction of the fourth alignment area being opposite to the first alignment direction, wherein
when the display panel is in a narrow viewing angle display mode, a driving voltage at the first sub-pixel areas in the at least one first area is substantially lower than a driving voltage at the second sub-pixel areas in the at least one first area and a driving voltage at the first sub-pixel areas in the at least one second area, and the driving voltage at the second sub-pixel areas in the at least one first area is substantially higher than the driving voltage at the first sub-pixel areas in the at least one second area and a driving voltage at the second sub-pixel areas in the at least one second area.

2. The display apparatus of claim 1, wherein when the display panel is in the narrow viewing angle display mode, the first sub-pixel areas and the second sub-pixel areas in the at least one first area are enabled, and the first sub-pixel areas in the at least one second area are enabled.

3. The display apparatus of claim 1, wherein when the display panel is in the narrow viewing angle display mode, the second sub-pixel areas in the at least one first area and the first sub-pixel areas in the at least one second area are enabled, and the first sub-pixel areas in the at least one first area are disabled.

4. The display apparatus of claim 1, wherein a second alignment direction of the second alignment area is opposite to a third alignment direction of the third alignment area.

5. The display apparatus of claim 1, wherein a second alignment direction of the second alignment area and a third alignment direction of the third alignment area are substantially parallel to the horizontal axis direction, and the fourth alignment direction and the first alignment direction are substantially perpendicular to the horizontal axis direction.

6. The display apparatus of claim 1, wherein when the display panel is in the narrow viewing angle display mode, the driving voltages at the first sub-pixel areas and the second sub-pixel areas located in the at least one second area during displaying a normal viewing brightness are lower than the driving voltages at the second sub-pixel areas located in the at least one first area during displaying the normal viewing brightness.

7. The display apparatus of claim 1, wherein when the display panel is in the narrow viewing angle display mode, the driving voltages at the first sub-pixel areas located in the at least one second area during displaying a normal viewing brightness are different from the driving voltages at the second sub-pixel areas located in the at least one second area during displaying the normal viewing brightness.

8. The display apparatus of claim 1, wherein when the display panel is in the narrow viewing angle display mode, the driving voltage at the first sub-pixel areas located in the at least one second area during displaying a normal viewing brightness are equal to the driving voltage at the second sub-pixel areas located in the at least one second area during displaying the normal viewing brightness.

9. The display apparatus of claim 1, wherein each of the pixel units further comprises a third sub-pixel area, a fifth alignment direction of each of the third sub-pixel areas in the at least one first area intersects the first light-transmission axis direction by about 0 degree to about 45 degrees, a sixth alignment direction of each of the third pixel areas in the at least one second area intersects the second light-transmission axis direction by about 0 degree to about 45 degrees, and each of the second sub-pixel areas and each of the third sub-pixel areas in the at least one first area and the at least one second area are enabled when the display panel is in the narrow viewing angle display mode.

10. The display apparatus of claim 9, wherein when the display panel is in a wide viewing angle display mode, the third sub-pixel areas are disabled.

11. The display apparatus of claim 9, wherein the fifth alignment direction is not parallel to the first light-transmission axis direction, and the sixth alignment direction is not parallel to the second light-transmission axis direction.

12. The display apparatus of claim 9, wherein each of the pixel units is driven by three scan lines and one data line.

13. The display apparatus of claim 9, wherein each of the pixel units is driven by two scan lines and two data lines.

14. The display apparatus of claim 9, wherein each of the pixel units comprises:
a first scan line;
a second scan line;
a common line;
a data line intersecting the first scan line, the second scan line, and the common line;
a first pixel electrode defining the first sub-pixel area;
a second pixel electrode defining the second sub-pixel area;
a third pixel electrode defining the third sub-pixel area, wherein the first scan line is located between the first pixel electrode and the second pixel electrode, and the second scan line is located between the first pixel electrode and the third pixel electrode;
a first active device driven by the first scan line and connected to the data line, the first pixel electrode, and the second pixel electrode;
a second active device driven by the second scan line and connected to the data line and the third pixel electrode; and
a third active device driven by the second scan line and connected to the common line and the first pixel electrode.

15. The display apparatus of claim 14, wherein when the display panel is in a wide viewing angle display mode, the second scan line is enabled before the first scan line is enabled, and when the display panel is in the narrow viewing angle display mode, the first scan line is enabled before the second scan line is enabled.

16. The display apparatus of claim 9, wherein each of the pixel units comprises:
a first scan line;

a second scan line;

a data line intersecting the first scan line and the second scan line;

a first pixel electrode defining the first sub-pixel area;

a second pixel electrode defining the second sub-pixel area;

a third pixel electrode defining the third sub-pixel area, wherein the first scan line is located between the first pixel electrode and the second pixel electrode, and the third pixel electrode is located between the second pixel electrode and the second scan line;

a first active device driven by the first scan line and connected to the data line, the first pixel electrode, and the second pixel electrode; and a second active device driven by the second scan line and connected to the data line, the second pixel electrode, and the third pixel electrode.

17. The display apparatus of claim 16, wherein when the display panel is in a wide viewing angle display mode, the second scan line and the first scan line are sequentially enabled, and when the display panel is in the narrow viewing angle display mode, the first scan line and the second scan line are sequentially enabled.

18. The display apparatus of claim 1, wherein the first sub-pixel areas and the second sub-pixel areas are in different rows.

* * * * *